United States Patent [19]

Watanabe

[11] Patent Number: 4,831,458
[45] Date of Patent: May 16, 1989

[54] IMAGE INFORMATION SCANNER APPARATUS WITH ADJUSTMENT STATE DISPLAY FUNCTION

[75] Inventor: Yoshio Watanabe, Kawasaki, Japan

[73] Assignee: Kabushiki Kaisha Toshiba, Kawasaki, Japan

[21] Appl. No.: 42,372

[22] Filed: Apr. 24, 1987

[30] Foreign Application Priority Data

May 9, 1986 [JP] Japan ................................. 61-105860

[51] Int. Cl.⁴ ............................................. H04M 1/00
[52] U.S. Cl. .................................... 358/280; 353/293; 353/294
[58] Field of Search ............... 358/280, 256, 287, 283, 358/77, 293, 294

[56] References Cited

U.S. PATENT DOCUMENTS 4,423,439 12/1983 Watanabe ............................. 358/287
4,583,127 4/1986 Kurata et al. ........................ 358/287

FOREIGN PATENT DOCUMENTS 3420553 12/1984 Fed. Rep. of Germany .
3429546 2/1985 Fed. Rep. of Germany .

Primary Examiner—Edward L. Coles, Sr.
Attorney, Agent, or Firm—Cushman, Darby & Cushman

[57] ABSTRACT

A mode designation section selectively designates a normal image scanning mode and an adjustment mode. An operation section can designate a first operation item associated with a normal image scanning operation by an image scanner section and a signal processing section when the normal image scanning mode is designated, or can designate a second operation item associated with at least one of the image scanner section and the signal processing section when the adjustment mode is designated. A display can display the first operation item when the normal image scanning mode is designated and can display the second operation item when the adjustment mode is designated. A controller supplies control signals for the normal image scanning operation or the adjustment operation to the image scanner section and the signal processing section when the normal image scanning mode or the adjustment mode is designated and the first or second operation item is designated, and supplies display signals for displaying first or second content in association with the designated first or second operation item to the display.

16 Claims, 12 Drawing Sheets 4,831,458

IMAGE INFORMATION SCANNER APPARATUS WITH ADJUSTMENT STATE DISPLAY FUNCTION

BACKGROUND OF THE INVENTION

This invention relates to an image information scanner apparatus with an adjustment state display function and, more particularly, to an image information scanner apparatus applied to a copying machine or a facsimile device to scan an original image.

A conventionally known image information scanner apparatus is applied to a thermal transfer color copying machine using a thermal transfer ink ribbon of a plurality of colors to perform color copying. In some scanner apparatuses of this type, an optical system comprising a rod lens array, a light source for illuminating an original, and a plurality of photoelectric converting elements are integrally arranged on a carriage. In this case, the carriage reciprocates along the lower surface of an original table to optically scan an original placed thereon, thereby obtaining image information (signals).

In the image information scanner apparatus having the above arrangement, various adjustments performed in the manufacturing processes at a factory or for maintenance at a user's location are performed by observing signal waveforms output from a test terminal provided to an image signal amplifying circuit in the main apparatus body by an external measuring instrument such as an oscilloscope. That is, in order to adjust an offset voltage of the image signal amplifying circuit, the light source for illumination is turned off, the rod lens array is shielded, and then a white reference reflecting plate for adjustment is scanned. In this state, the signal waveform which is observed by the oscillator is adjusted so as to be a predetermined value by moving a variable resistor for offset voltage adjustment of the amplifying circuit.

In addition, in order to adjust the amplification factor (gain) of the image signal amplifying circuit, the white reference reflecting plate is scanned with the light source on. In this state, the maximum amplitude of the signal waveform which is observed by the oscilloscope is adjusted so as to be a predetermined value by moving the variable resistor for amplification factor adjustment of the amplifying circuit.

In order to adjust an optical axis of the optical system, light-receiving portions of the plurality of photoelectric converting elements must be adjusted so as to be placed on an optical axis of the rod lens array. Since the amount of light at the photoelectric converting element is at its maximum on the optical axis, the above optical axis adjustment is performed such that the white reference reflecting plate is scanned with the light source on. The light-receiving portions of the photoelectric converting elements are adjusted to a position where the photoelectric converting elements, i.e., signal waveforms output from the amplifying circuit and observed by the oscilloscope are at maximum.

Furthermore, in order to adjust the focusing state of the optical system, the surface of the original must be adjusted to be placed at a front focus of the rod lens array. For this focus adjustment of the optical system, an image of the rectangular wave density lattice is scanned. In this state, the entire carriage, on which the rod lens array, the light source, and the photoelectric converting elements are fixed, is moved to adjust a distance with respect to the surface of the rod lens array on which the original is placed, so that the amplitude of the signal waveform observed by the oscilloscope is maximized.

As described above, in the image information scanner apparatus, various adjustments are performed using an external oscilloscope. Therefore, an adjustment reference or tolerance is not clear because an adjustment state is not numerically defined, potentially resulting in large adjustment errors. In addition, since a measuring instrument such as an oscilloscope is required for adjustment, preparation for measurement is troublesome, skill is required to operate the measuring instrument, and use of the required measuring instrument leads to high cost.

SUMMARY OF THE INVENTION

It is, therefore, an object of the present invention to provide a new and improved image information scanner apparatus with an adjustment state display function which numerically displays an adjustment state and clears an adjustment reference or tolerance so as to reduce adjustment errors, and which can easily perform adjustments without use of an external measuring instrument.

According to the present invention, there is provided an image information scanner apparatus with an adjustment state display function, the apparatus comprising:

image scanner means having an optical system for optically scanning an original to obtain an optical image corresponding to an image of the original and photoelectric converting means for converting the optical image obtained by the optical system into an electrical signal;

signal processing means for receiving the electrical signal from the photoelectric converting means of the image scanner means, and for performing predetermined signal processing to obtain predetermined image data;

mode designation means for selectively designating a normal image scanning mode and an adjustment mode;

operation means capable of designating a first operation item associated with a normal image scanning operation by the image scanner means and the signal processing means when the normal image scanning mode is designated by the mode designation means, and capable of designating a second operation item associated with at least one of the image scanner means and the signal processing means when the adjustment mode is designated by the mode designation means;

display means capable of displaying a first content in association with the first operation item designated by the operation means when the normal image scanning mode is designated by the mode designation means, and capable of displayng a second content in association with the second operation item designated by the operation means when the adjustment mode is designated by the mode designation means; and control means for supplying control signals for the normal image scanning operation or the adjustment operation to the image scanner means and the signal processing means when the normal image scanning mode or the adjustment mode is designated and the first or second operation item is designated, and for supplying display signals for displaying in association with the designated first or second operation item, to the display means.

BRIEF DESCRIPTION OF THE DRAWINGS

These and other objects and features of the present invention can be understood through the following embodiment by reference to the accompanying drawings, in which

FIGS. 9 to 12 are flow charts for explaining operations of adjustment modes, respectively, in which FIG. 9 is a flow chart of an offset adjustment mode;

FIG. 10 is a flow chart of a gain adjustment mode;

FIG. 11 is a flow chart of an optical axis adjustment mode; and

FIG. 12 is a flow chart of a focus adjustment mode;

DETAILED DESCRIPTION OF THE PREFERRED EMBODIMENT

An embodiment of the present invention will now be described in detail with reference to the accompanying drawings.

Figure 2:
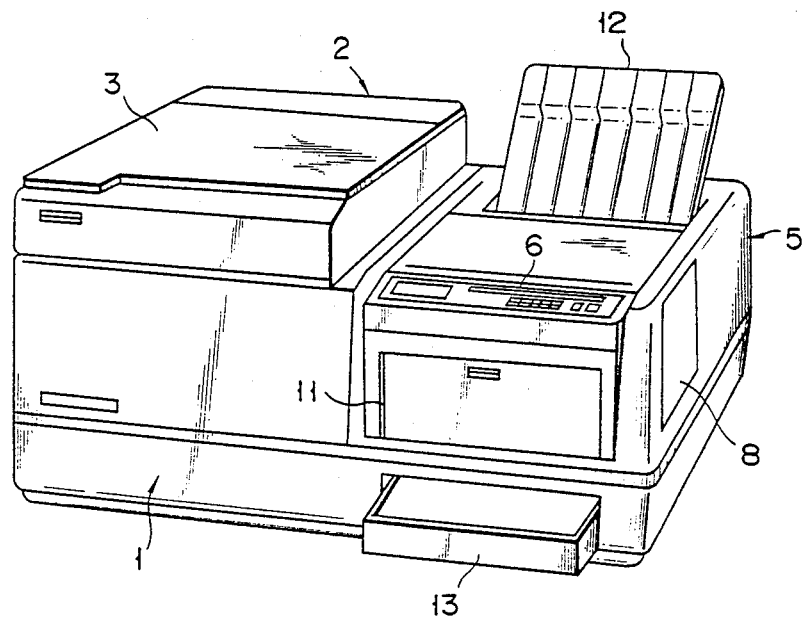
FIG. 2 is a perspective view of an exterior of a thermal transfer color copying machine to which the present invention is applied.

FIG. 2 shows an exterior of a thermal transfer color copying machine as an example to which an image information scanner apparatus of the present invention is applied. Image information scanner apparatus 2 is detachably provided on the upper surface of apparatus main body 1. Original cover 3 is provided to apparatus 2 to be freely opened/closed. An original table, on which an original is placed, is provided below cover 3 of scanner apparatus 2 (a detailed description thereof will be presented below). A carriage portion comprising an exposure optical system reciprocates along the lower surface of the above-mentioned original table to optically scan the original set on the original table. Optical information thus scanned is photoelectrically converted to obtain image information (signals). Image information (signals) scanned by scanner apparatus 2 is supplied to image formation portion 5 detachably provided at the right side of body 1. Image formation portion 5 forms an image on paper as an image formation medium in accordance with the scanned image information. Operation panel 6 is provided on an upper front surface of image formation portion 5. In addition, guide portion 11 is provided on a front surface of image formation portion 5 to be freely opened/closed so as to manually feed paper, and copy receiving tray 12 is provided on an upper surface thereof to receive paper having a transferred image thereon. Furthermore, paper feed cassette 13 for storing paper is detachably provided to body 1 located below image formation portion 5. Note that reference numeral 8 denotes a door for attaching/detaching a thermal transfer ink ribbon as a transfer agent to be described later.

Figure 3:
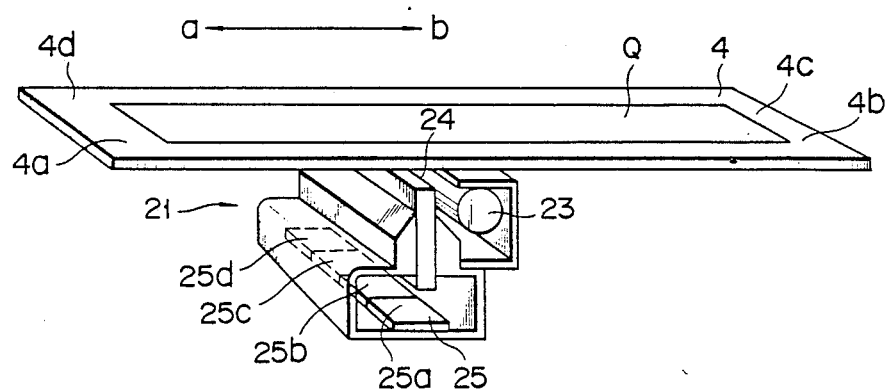
FIG. 3 is a perspective view of a schematic arrangement of an image information scanner apparatus.

FIG. 3 shows an arrangement of apparatus 2. Original table 4 made of transparent glass, on which original Q is placed, is provided below cover 3. Carriage 21 is provided below table 4 to be freely reciprocated in directions represented by arrows a and b in FIG. 3. Light source 23 is disposed inside carriage 21. Rod lens array 24 is disposed near light source 23. Photoelectric converter 25 is provided at the lower end of array 24, i.e., carriage 21. Converter 25 is constituted by, e.g., 4 color CCDs 25a, 25b, 25c, and 25d.

Figure 1:
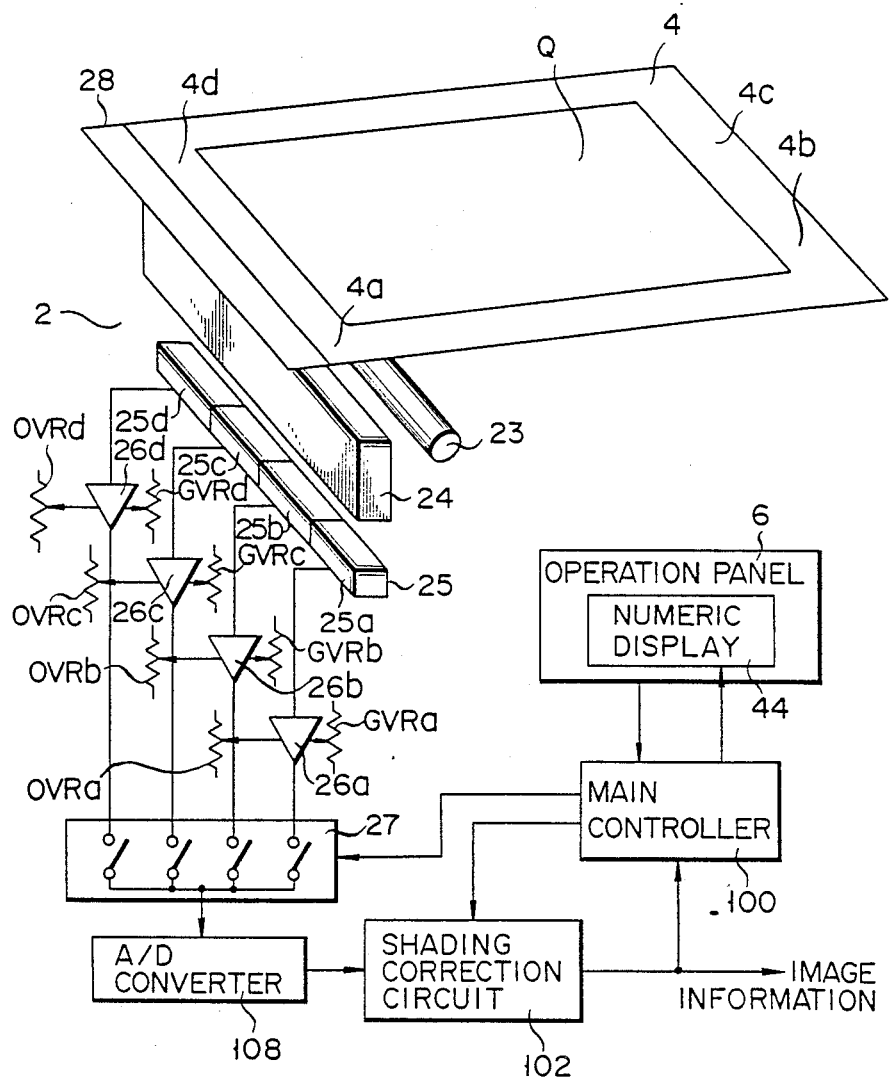
FIG. 1 is a schematic view of an important part for explaining an embodiment of the present invention.

Carriage 21 is slidably inserted in a guide shaft (not shown) at one end thereof, and are mounted to a so-called timing belt such as a toothed belt (not shown) looped around the guide shaft. The timing belt is driven by a stepping motor to move carriage 21 in the directions represented by arrows a and b in FIG. 3. Note that scanner apparatus 2 includes: amplifiers (image signal amplifying circuits) 26a to 26d for amplifying output signals from color CCDs 25a to 25d as shown in FIG. 1 and to be described later); A/D (Analog/Digital) converter 108 for converting the output signals from amplifiers 26a to 26d into digital signals sequentially through 1st to 4th contacts of analog switch 27; shading correction circuit 102 for correcting the output signals from A/D converter 108 in accordance with illumination irregularity of light source 23 and sensitivity irregularity of converter 25 to normalize signal levels; and a flat cable (not shown) for supplying power output from an inverter to light source 23 and for supplying the output signals from A/D converter 108 to image information portion 5.

Figure 4:
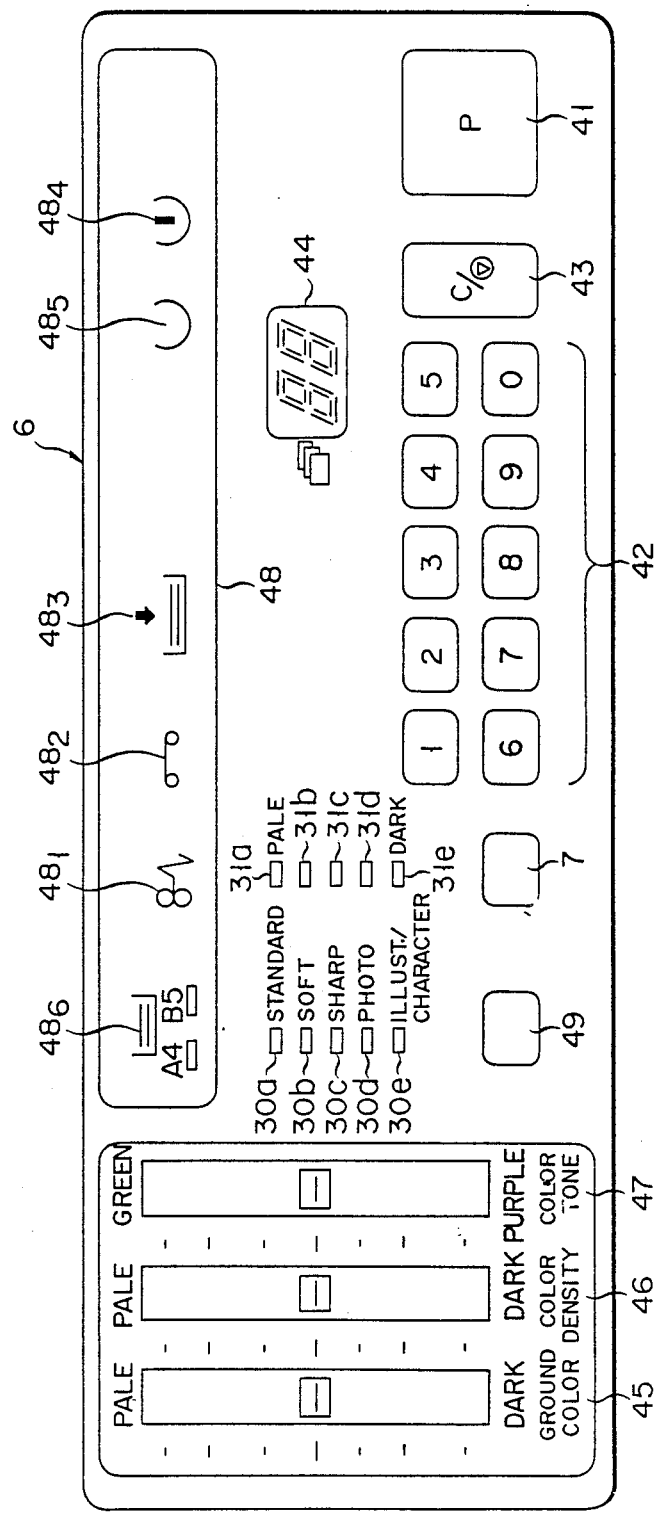
FIG. 4 is a plan view of an arrangement of an operation panel.

FIG. 4 shows panel 6. Panel 6 includes print key 41 for instructing print start (transfer), ten keys 42 for specifying the number of prints, clear/stop key 43 for releasing the specified number of prints or for stopping printing, numeric display 44 for displaying the number of prints and the like, ground color set portion 45 for setting density of the ground color, color density set portion 46 for setting color density, color tone set portion 47 for setting color tone, display 48 for displaying various information, original mode key 49 for selecting modes in accordance with the image type of the original, display portions 30a, 30b, 30c, 30d, and 30e for displaying the selected mode, color density key 7 for switching printing density in 5 steps, and display portions 31a, 31b, 31c, 31d, and 31e for displaying the set color density. Display 48 includes jamming display portion $48_1$ which is illuminated when a sheet of paper is jammed inside body 1, ribbon display portion $48_2$ for displaying various states such as no ribbon in a ribbon cassette which is to be mounted to body 1 or no ribbon cassette, paper display portion $48_3$ for displaying how a paper feed cassette 13 is mounted or the presence or absence of paper, wait/ready display portions $48_4$ and $48_5$ for displaying an operation state of the copying machine, and paper size display portion $48_6$ for displaying the size of paper in cassette 13 which is mounted to body 1.

After a switch (not shown) provided inside body 1 is switched to turn on a power source, a predetermined code number is input from ten keys 42 of panel 6 to set scanner apparatus 2 in an adjustment mode.

This code number is specified so as to be distinguished from a normal key operation for setting the number of prints or a key-in numeral obtained by erroneously touching keys.

When scanner apparatus 2 is set in the adjustment mode, key 49 of panel 6 is operated as a key for specifying an adjustment item, and key 7 is operated as a key for specifying a channel (adjustment position) (ch)1 to (ch)4. In addition, key 41 is operated as a key for instructing adjustment start, key 43 is operated as a key for instructing adjustment end with respect to an adjustment item specified by key 49, and display 44 is operated as a display for displaying adjustment states in each adjustment item and a channel.

More specifically, when scanner apparatus 2 is set in the adjustment mode and a first position corresponding to a standard original mode is specified by key 49, display portion 30a is illuminated, and an offset voltage adjustment mode of amplifiers 26a to 26d is set. During the offset voltage adjustment mode, i.e., when display portion 30a is illuminated, if first channel (ch)1 corresponding to the palest color density is specified by key 7, display 31a is illuminated, and CCD 25a is selected. Thus, offset voltage adjustment at amplifier 26a corresponding to CCD 25a is specified. When display portion 30a is illuminated and second channel (ch)2 is specified by key 7, display portion 31b is illuminated, and CCD 25b is selected. Thus, offset voltage adjustment at amplifier 26b corresponding to CCD 25b is specified. When display portion 30a is illuminated and third channel (ch)3 is specified by key 7, display portion 31c is illuminated, and CCD 25c is selected. Thus, offset voltage adjustment at amplifier 26c corresponding to CCD 25c is specified. When display 30a is illuminated and channel (ch)4, i.e., a position corresponding to the second darkest density is specified by key 7, display portion 31d is illuminated, and CCD 25d is selected. Thus, offset voltage adjustment at amplifier 26d corresponding to CCD 25d is specified.

When the second position corresponding to a soft original mode is specified by key 49 during the adjustment mode operation of scanner apparatus 2, display 30b is illuminated, and a gain (amplification factor) adjustment mode of amplifiers 26a to 26d is set. During the gain adjustment mode, i.e., when display portion 30b is illuminated, if channel (ch)1 is specified by key 7, display portion 31a is illuminated, and CCD 25a is selected. Thus, gain adjustment at amplifier 26a corresponding to CCD 25a is specified. When display 30b is illuminated and second channel (ch)2 is specified by key 7, display portion 31b is illuminated, and CCD 25b is selected. Thus, gain adjustment at amplifier 26b corresponding to CCD 25b is specified. When display portion 30b is illuminated and third channel (ch)3 is specified by key 7, display portion 31c is illuminated, and CCD 25c is selected. Thus, gain adjustment at amplifier 26c corresponding to CCD 25c is specified. When display portion 30b is illuminated and fourth channel (ch)4 is specified, display portion 31d is illuminated, and CCD 25d is selected. Thus, gain adjustment at amplifier 26d corresponding to CCD 25d is specified.

When a third position corresponding to a sharp original mode is specified by key 49 during the adjustment mode operation of scanner apparatus 2, display portion 30c is illuminated, and an optical axis adjustment mode is set. During the optical axis adjustment mode, i.e., when display portion 30c is illuminated, if first channel (ch)1 is specified by key 7, display portion 31a is illuminated and CCD 25a is selected. Thus, optical axis adjustment between a light-receiving portion of CCD 25a and array 24 is specified. When display 30c is illuminated, if second channel (ch)2 is specified, display 31b is illuminated and CCD 25d is selected. Thus, optical axis adjustment between a light-receiving portion of CCD 25d and array 24 is specified.

During the adjustment mode operation of scanner apparatus 2, when a fourth position corresponding to a photo mode is specified by key 49, display 30d is illuminated, and a focus adjustment mode is set. During the focus adjustment mode, i.e., when display portion 30d is illuminated, if first channel (ch)1 is specified by key 7, display portion 31a is illuminated, and CCD 25a corresponding to scanning position 4a of table 4 is selected. Thus, focus adjustment with respect to scanning position 4a of table 4 is specified. When display portion 30d is illuminated and second channel (ch)2 is specified by key 7, display portion 31b is illuminated, and CCD 25b corresponding to scanning position 4b of table 4 is selected. Thus, focus adjustment with respect to scanning position 4b of table 4 is specified. When display portion 30d is illuminated and third channel (ch)3 is specified by key 7, display portion 31c is illuminated, and CCD 25c corresponding to scanning position 4c of table 4 is selected. Thus, focus adjustment with respect to scanning position 4c of table 4 is specified. When display portion 30d is illuminated and fourth channel (ch)4 is specified by key 7, display portion 31d is illuminated, and CCD 25d corresponding to scanning position 4d of table 4 is selected. Thus, focus adjustment with respect to scanning position 4d of table 4 is specified. Note that in this embodiment, since array 24 and converter 25 are formed integrally with each other by carriage 21, carriage 21 is moved together to change a distance between the surface of table 4 and array 24 so as to perform focus adjustment.

Figure 5:
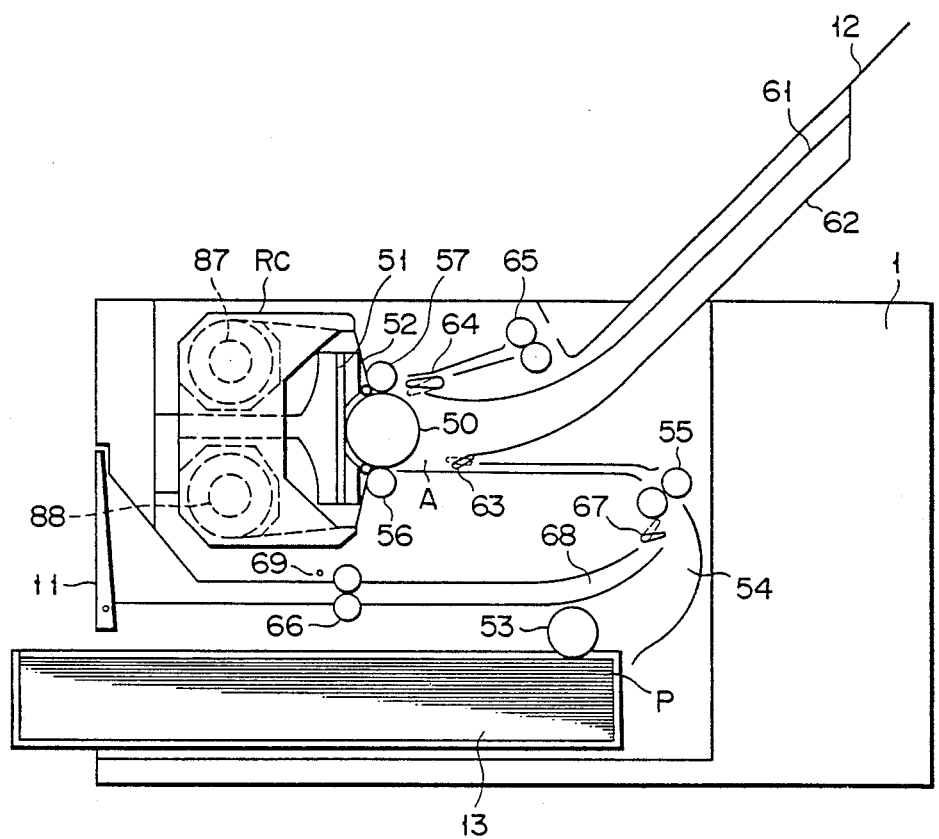
FIG. 5 is a side sectional view of an arrangement of an image formation portion.

Image formation portion 5 has the arrangement as shown in FIG. 5. That is, platen 50 is located at a substantially central portion of image formation portion 5. Thermal head 51 as a recording head (heat sensitive head) is located before (left side in FIG. 5) platen 50 to contact platen 50.

Head 51 is housed in ribbon cassette Rc. Thermal transfer ink ribbon (thermal transfer ribbon) 52 as an image formation medium is interposed between head 51 and platen 50. Paper (image forming medium) P is urged against platen 50 with ribbon 52 interposed therebetween. In this state, when heat-generating elements (not shown) formed in a line dot manner of head 51 generate heat in accordance with image information, ink on ribbon 52 is heated and melted to be transferred onto paper P.

A feed roller 53 is provided obliquely below platen 50 of body 1 so as to sequentially (one by one) feed sheets of paper P housed in cassette 13. Paper P fed by feed roller 53 is supplied to register rollers 55 located obliquely above mentioned roller 53 through paper guide passage 54. The distal end of paper P is aligned by rollers 55. Thereafter, paper P is transferred to platen 50 so as to be accurately wound around platen 50 by press rollers 56 and 57.

Figure 6:
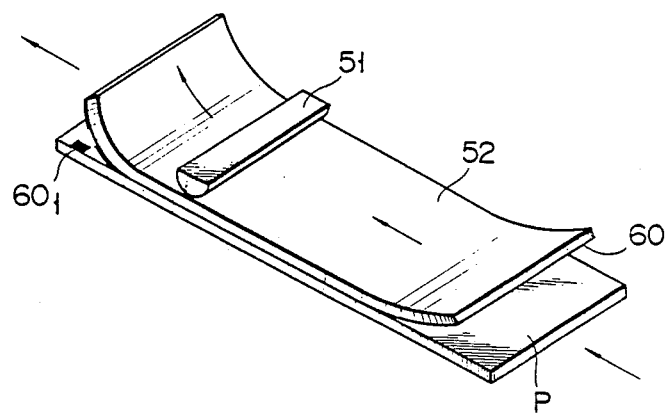
FIG. 6 is a perspective view for explaining a transfer operation state.

Head 51 urges paper P against platen 50 through ribbon 52. Therefore, as shown in FIG. 6, ink 60 on ribbon 52 is heated and melted so as to be transferred onto paper P.

Figure 7:
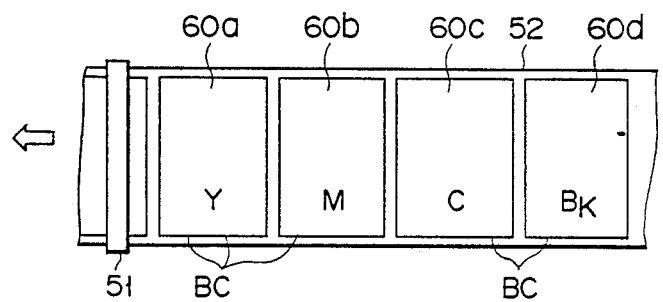
FIG. 7 is a plan view of a thermal transfer ink ribbon showing how an ink is coated.

Ribbon 52 is obtained by arranging ink portions 60a, 60b, 60c, and 60d, i.e., yellow (Y), magenta (M), cyan (C), and black ($B_L$), as shown in FIG. 7. Ink portions 60a to 60d are accurately and sequentially stacked on paper P in accordance with image information so as to be transferred thereon one by one (to be described later).

Bar codes BC are provided at side edge portions corresponding to ink portions 60a to 60d of ribbon 52 so as to discriminate ink portions 60a to 60d so that the distal ends thereof coincide with the distal ends of paper P. Bar codes BC are detected by a bar code detector (not shown).

Note that a thermal transfer ink ribbon not having a black ink portion (60d) can produce a substantially black color by stacking three other colors (60a to 60c).

Thus, paper P is reciprocated by rotation of platen 50 with respect to head 51 by the number of transfer colors corresponding to image information. At this time, paper P is reciprocated along a passage including first and second guides 61 and 62 sequentially disposed along the lower surface of tray 12.

That is, paper P supplied from cassette 13 passes between register rollers 55 and first distributing gate 63 and then is wound around platen 50, as described above. In this state, platen 50 is rotated by a stepping motor (not shown) as a drive source to move paper P at a predetermined speed. Heat generating elements (not shown) of head 51 formed in a line dot manner along the axial direction of platen 50 generate heat in accordance with image information with paper P opposing ink portion 60a of ribbon 52, and ink 60a of ribbon 52 is transferred onto paper P.

Paper P, on which ink 60a is transferred, is supplied onto first guide 61 provided along the lower surface of tray 12 by second distributing gate 64. Then, by a reverse rotation operation of platen 50 and a rotation displacing operation of gate 63, paper P is supplied onto second guide 62 provided along the lower surface of guide 61.

As described above, paper P is reciprocated between head 51 and guides 61 and 62 a plurality of times to transfer plurality of colors.

Paper P, on which ink 60 of all the required colors are transferred, is discharged onto tray 12 through a pair of paper discharging rollers 65 by gate 64.

Note that in FIG. 5, switch 69 detects paper which is manually fed. By driving rollers 66 in accordance with this detection, manually-fed paper P is supplied to rollers 55 through guide passage 68 and switch 67. Thereafter, similar to the case described above, manually-fed paper P is subjected to image transfer.

Figure 8:
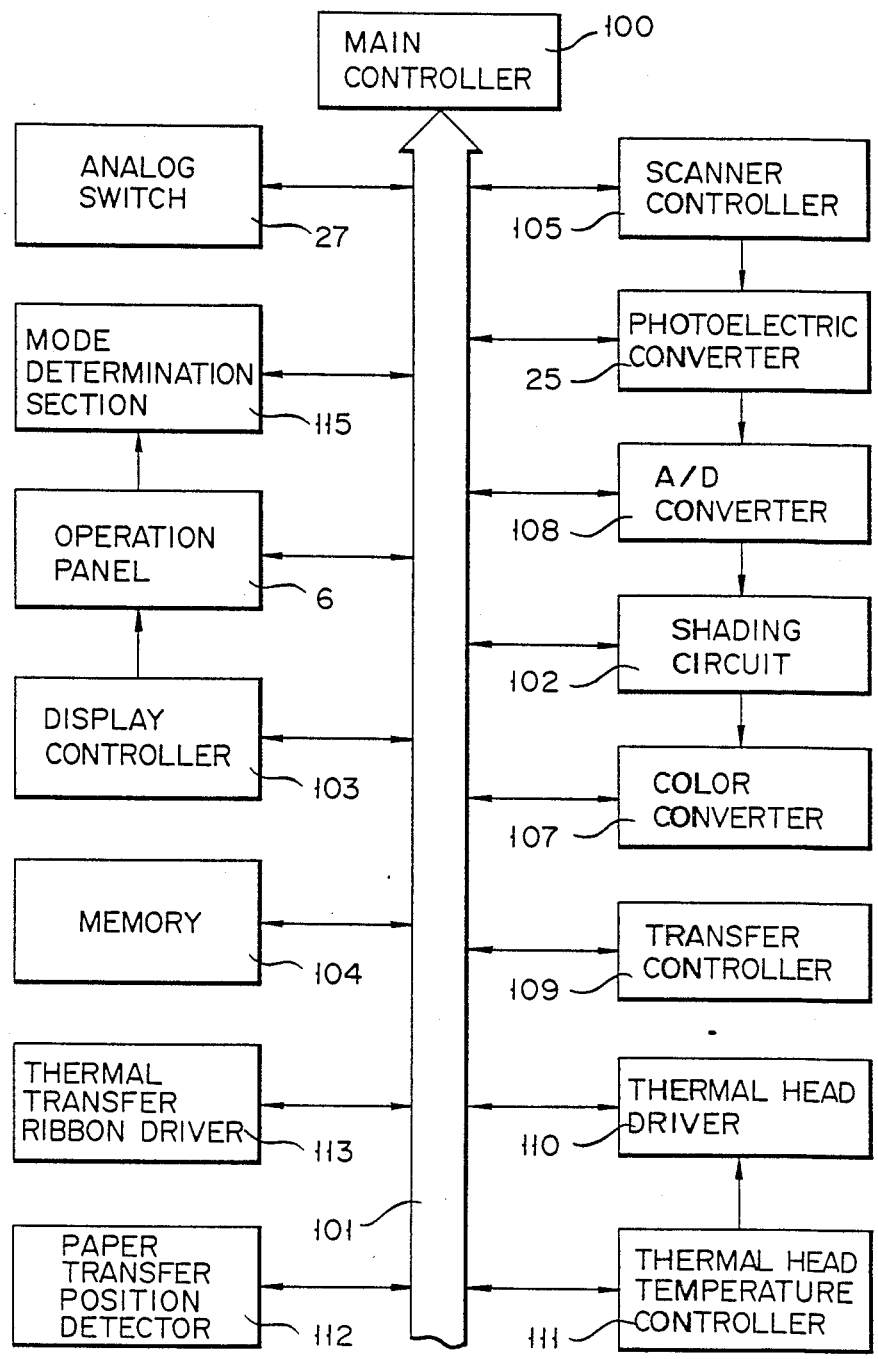
FIG. 8 is a block diagram of an arrangement of a control system.

FIG. 8 schematically shows an entire control system. That is, main controller 100 is mainly constituted by, e.g., a CPU (Central Processing Unit) and its peripheral circuits. Bus line 101 is connected to controller 100. Line 101 is connected to operation panel 6 of image formation portion 5, mode discrimination section 115 discriminating operation modes by operation of panel 6, display controller 103 for controlling various display portions, memory 104, scanner controller 105, photoelectric converter 25, analog switch 27, A/D converter 108, shading correction circuit 102, color converter 107, transfer controller 109, thermal head driver 110, and thermal head temperature controller 111. Controller 103 controls display 48 and numeric display 44 provided on panel 6 in accordance with signals supplied from controller 100 through line 101. Signals input by keys of panel 6 are supplied to controller 100 through line 101. Controller 100 controls in accordance with these signals and stores information supplied through line 101 and reads out stored information. Note that switch 27 is controlled by controller 100 such that its first to fourth contacts are sequentially turned on.

Controller 105 controls light source 23 of carriage 21 in accordance with signals supplied from controller 100 through line 101. Converter 25 scans the image on the original in accordance with signals supplied from controller 100 through line 101. Converter 108 digitizes signals output from converter 25 through amplifiers 26a to 26d and switch 27, and outputs digital color signals. Circuit 102 performs so-called shading correction with respect to signals output from converter 108. That is, shading correction is performed such that light source 23 is illuminated to scan a white reference (reflecting) plate (to be described later) provided at the edge of original table 4 before original Q is scanned. An output from converter 108 representing an image signal (white) level is defined as $I_W$. In addition, the above white reference plate is scanned with light source 23 turned off. An output from converter 108 representing an image signal (black) level is defined as $I_B$. $I_W$ and $I_B$ data are stored in a line memory (not shown). In this case, assuming that an output from converter 108 during the normal operation corresponds to I, correction value $I_O$ of circuit 102 is obtained by the following equation (1):

$$I_O = [(I - I_B)/(I_W - I_B)] \cdot a \qquad (1)$$

where a is a constant.

Therefore, circuit 102 corrects illumination irregularity by light source 23 or sensitivity irregularity of converter 25. That is, normalization is performed in units of pixels so that a signal level corresponding to a white portion of original Q becomes "1" and a signal level corresponding to a black portion thereof becomes "0".

Color converter 107 converts color signals of light output from circuit 102 into color signals for each ink, i.e., yellow, magenta, cyan, and black, and outputs these color signals to bus line 101. In addition, converter 107 can perform color conversion with respect to signals supplied from line 101, and can output new signals to line 101.

Transfer controller 109 operates in accordance with signals supplied from controller 100 through line 101 so as to selectively drive a platen drive motor for driving platen 50, a motor for driving paper feed roller 53, register roller 55, and a pair of discharging rollers 65, and a solenoid for driving first and second distributing gates 63 and 64 (the above motors and the solenoid are not shown). Thermal head driver 110 operates in accordance with signals supplied from controller 100 through line 101 and signals supplied from thermal head temperature controller 111 so as to drive heat-generating elements of thermal head 51. Controller 111 outputs temperature control signals to driver 110 in accordance with signals supplied from controller 100 through line 101.

Paper transfer position detector 112 counts the number of driving pulses of a motor of a transfer system (not shown) from the beginning of feeding of paper P so as to detect a transfer position (a transfer amount from a feeding position) of paper P.

Thermal transfer ribbon driver 113 controls a ribbon drive motor in accordance with a position signal of paper P supplied from controller 100 so as to drive reels 87 and 88 of cassette Rc to drive ribbon 52.

A circuit configuration of image information scanner apparatus 2 will be described in more detail.

Referring back to FIG. 1, original Q, placed on original table 4, is irradiated with light emitted from light source 23 in accordance with the depression of print key 41 of operation panel 6. Light radiated onto original Q is reflected by the surface thereof and imaged onto color CCDs 25a to 25d of photoelectric converter 25 by rod lens array 24. By means of CCDs 25a to 25d, the above reflected light is converted into image signals corresponding to original images. Image signals output from CCDs 25a to 25d are amplified by amplifiers 26a to 26d, and then sequentially converted into digital signals by A/D converter 108 through first to fourth contacts of analog switch 27, thereby forming signals of one line. Output signals from converter 108, i.e., signals of one line are supplied to shading correction circuit 102. Circuit 102 normalizes digital signals from converter 108 in units of pixels, as described above. Output signals from circuit 102 are supplied to image formation portion 5 as image information.

Note that variable resistors OVRa to OVRd and GBRa to GBRd for offset voltage adjustment and gain adjustment (to be described later) are externally connected to amplifiers 26a to 26d.

Adjustment mode operations of image information scanner apparatus 2 according to the present invention will now be described below.

First, a switch (not shown) provided inside apparatus main body 1 is switched to turn on a power source, and a predetermined code number is input by ten keys 42 of operation panel 6 to set an adjustment mode. Mode determination section 115 determines that code number data input by a key-in operation is for the adjustment mode through bus line 101, and main controller 100 is set in the adjustment mode. Note that controller 100 may have a function of mode determination section 115.

Figure 9:
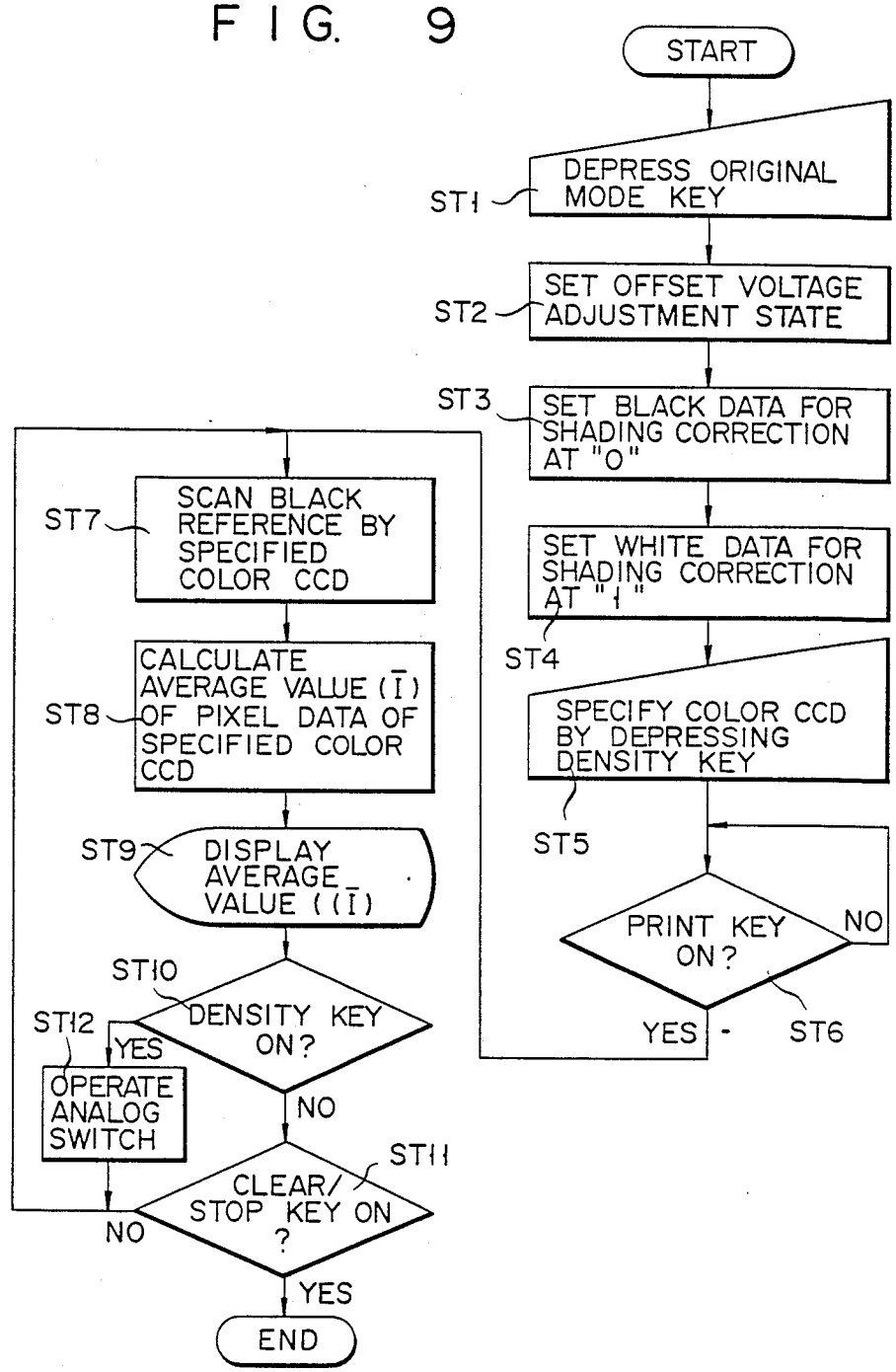

In this state, the above-mentioned offset voltage adjustment will be described with reference to the flow chart shown in FIG. 9. First, in steps ST1 and ST2, original mode key 49 of panel 6 is depressed to illuminate display portion 30a, so that the offset voltage adjustment state of the amplifiers is set.

Then, in steps ST3 and ST4, correction black data $I_B$ and white data $I_W$ stored in shading correction circuit 102 are forcibly set at "0" and "1", respectively, so that shading correction is released. In step ST5, display portion 31a is illuminated in accordance with depression of density key 7 of panel 6 so as to specify CCD 25a. Therefore, in step ST6, if print key 41 of panel 6 is depressed, offset voltage adjustment of amplifier 26a corresponding to CCD 25a is started.

In step ST7, white reference plate 28 is scanned with light source 23 turned off so as to scan a black reference signal. The black reference signal is fetched by main controller 100 through A/D converter 108 and circuit 102. Therefore, in step ST8, controller 100 calculates an average value $(\bar{I})$ of each pixel data included in an image range of specified CCD 25a. In step ST9, the calculated average value $(\bar{I})$ is displayed on numeric display 44 of panel 6.

In this state, an operator compares the average value displayed on display 44 with a predetermined value. In this comparison, if the average value is smaller than the predetermined value, variable resistor OVRa for offset voltage adjustment is adjusted. At the same time, operations between steps ST7 and ST11 are repeated, and the average value displayed on display 44 is varied in accordance with adjustment of the resistor. Then, if the displayed average value coincides with the predetermined value, the operator operates key 7 to specify, e.g., CCD 25b. Thus, the flow advances from step ST10 to ST12, and switch 27 is switched to its second contact by controller 100. In this case, since the average value $(\bar{I})$ of CCD 25b is displayed on display 44, the operator adjusts resistor OVRb for offset voltage adjustment of amplifier 26b in the same manner as described above.

When offset voltage adjustment using all the outputs from CCDs 25a to 25d is completed as described above, the operator operates clear/stop key 43. Then, in step ST11, the CPU determines that the offset voltage adjustment is completed, and the processing is completed.

Figure 10:
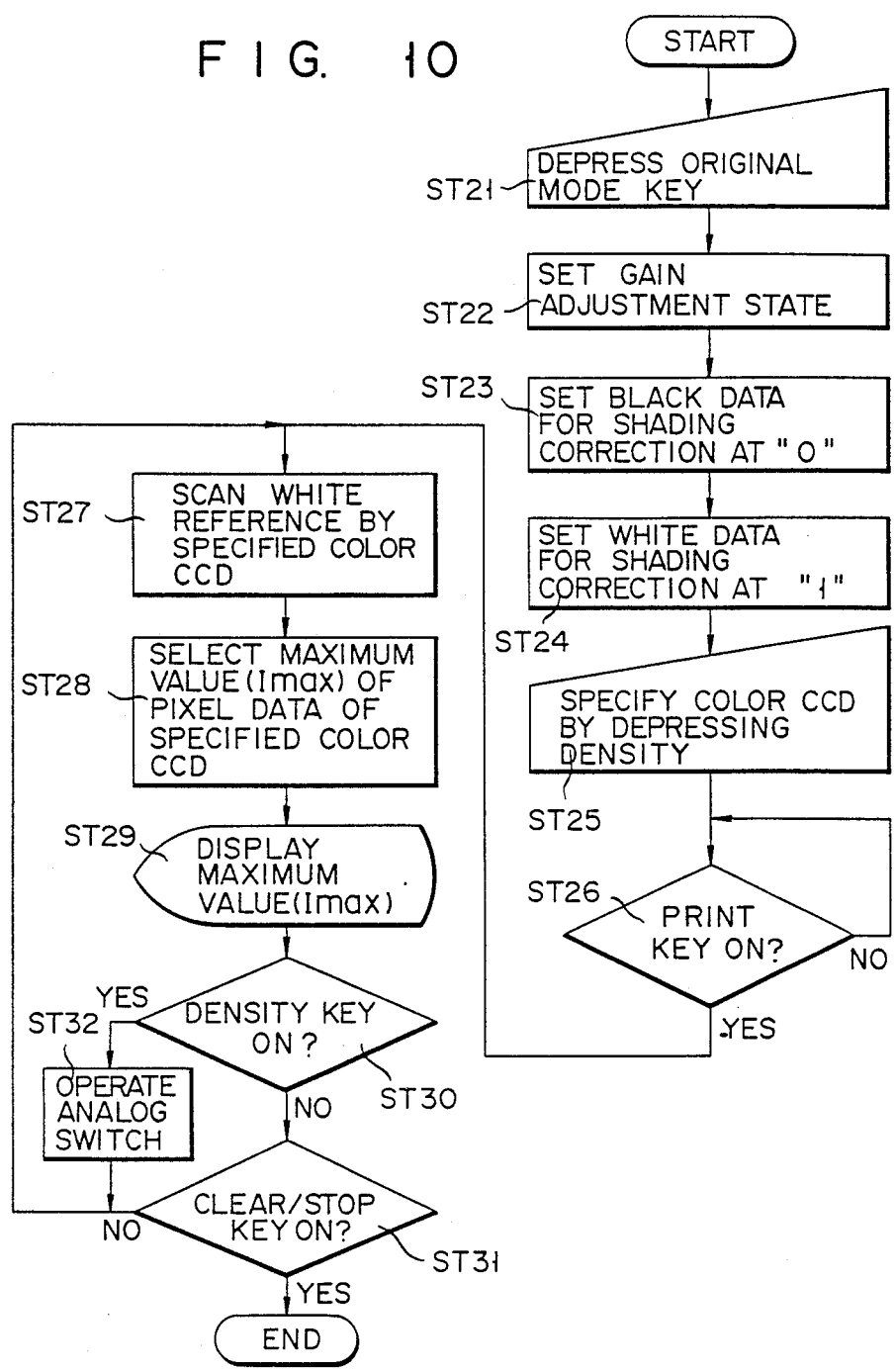

Referring to the flow chart of FIG. 10, the above-mentioned gain (amplification) adjustment in a state of the adjustment mode will be described below. First, in steps ST21 and ST22, key 49 of panel 6 is depressed to illuminate display portion 30b, and the gain adjustment state of the amplifier is set. Then, in steps ST23 and ST24, data $I_B$ and data $I_W$ of circuit 102 stored in the line memory are forcibly set at "0" and "1", respectively, so that shading correction is released. In step ST25, density key 7 of panel 6 is depressed to illuminate display portion 30a, so that CCD 25a is specified. Therefore, in step ST26, if key 41 of panel 6 is depressed, gain adjustment of amplifier 26a corresponding to CCD 25a is started.

In step ST27, white reference plate 28 is scanned with light source 23 turned on to read the white reference signal. The white reference signal is supplied to controller 100 through the first contact of switch 27, converter 108, and circuit 102. Therefore, in step ST28, controller 100 selects the maximum value (Imax) of each pixel data included in the image range of specified CCD 25a. In step ST29, the selected maximum value (Imax) is displayed on display 44 of panel 6.

In this state, the operator compares the maximum value displayed by display 44 with the predetermined value. In this comparison, if the maximum value does not coincide with the predetermined value, the operator adjusts resistor GVRa. At the same time, operations from step ST27 to step ST31 are repeated, and the maximum value displayed on display 44 is varied in accordance with adjustment of the resistor. If the maximum value coincides with the predetermined value, the operator operates key 7 to specify, e.g., CCD 25b. Therefore, the flow advances from step ST30 to step ST32, and switch 27 is switched to the second contact by controller 100. In this case, since the maximum value (Imax) of CCD 25b is displayed on display 44, the operator adjusts resistor GVRb of amplifier 26b, as described above.

When gain adjustment using all the outputs from CCDs 25a to 25d is completed, the operator operates key 43. Then, in step ST31, the CPU determines that the gain adjustment is completed, so that the processing is completed.

Figure 11:
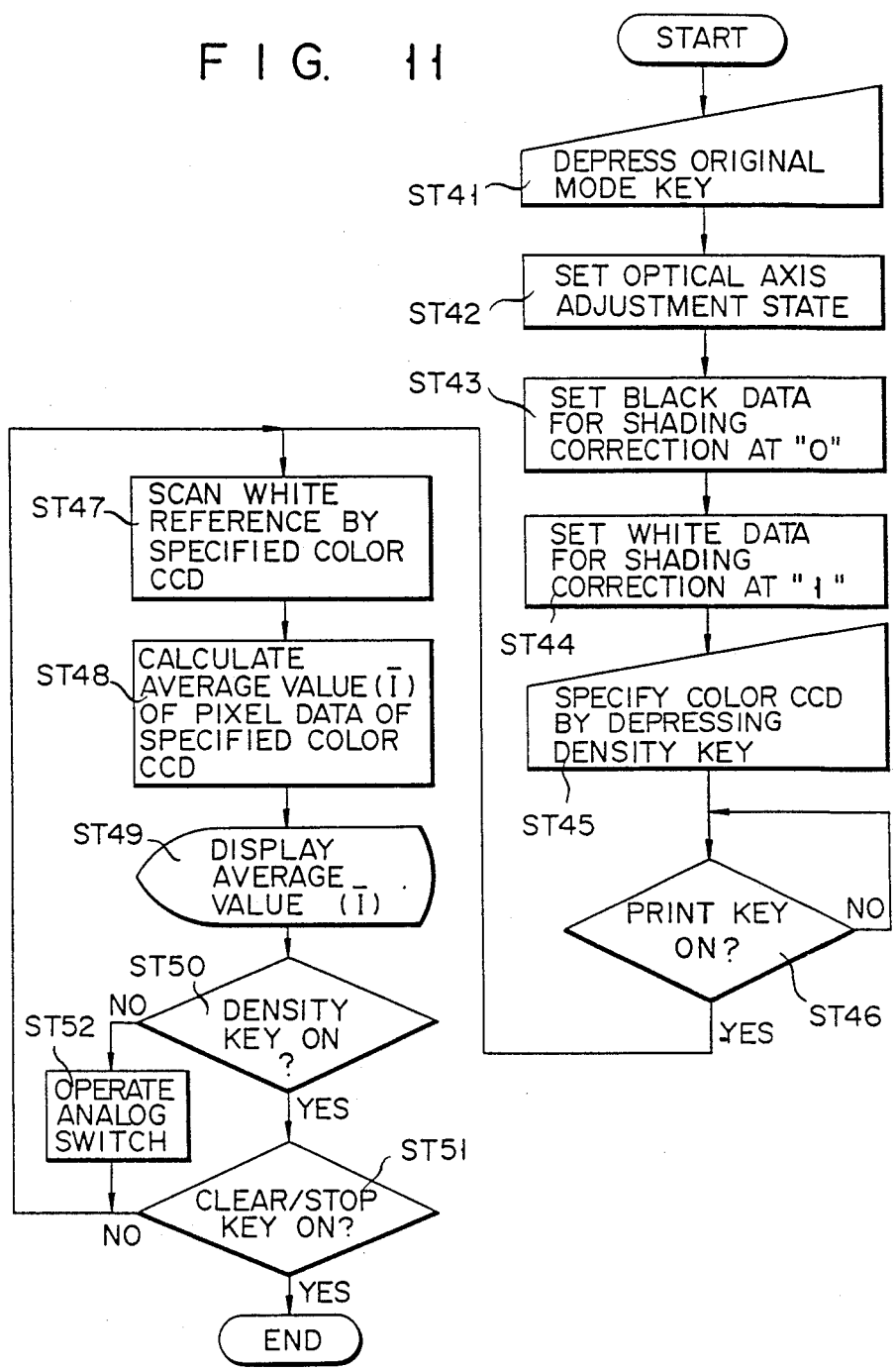

Referring to the flow chart of FIG. 11, the above-mentioned optical axis adjustment of the optical system in the state of the adjustment mode will be described below. First, in steps ST41 and ST42, key 49 of panel 6 is depressed to illuminate display portion 30c, so that the optical axis adjustment state of the optical system is set. Then, in steps ST43 and ST44, data $I_B$ and data $I_W$ of circuit 102 stored in the line memory are forcibly set at "0" and "1", respectively, so that shading correction is released. In step ST45, key 7 of panel 6 is depressed to illuminate display portion 31a, so that CCD 25a is specified. Therefore, in step ST46, if key 41 of panel 6 is depressed, optical axis adjustment between the light-receiving portion of CCD 25a and array 24 is started.

In step ST47, plate 28 is scanned, with light source 23 turned on, to read the white reference signal. The white reference signal is supplied to controller 100 through the first contact of switch 27, converter 108, and circuit 102. Therefore, in step ST48, controller 100 calculates the average value ($\bar{I}$) of each pixel data included in the image range of specified CCD 25a. In step ST49, the calculated average value (I) is displayed on display 44 of panel 6.

In this state, the operator compares the average value displayed on display 44 with the predetermined value. In this comparison, if the average value is not a maximum value, a position of CCD 25a is adjusted.

At the same time, operations from step ST47 to step ST51 are repeated, and the average value displayed on display 44 is varied in accordance with adjustment of CCD 25a. If the average value is the maximum value, the operator operates key 7 to specify, e.g., CCD 25d. Therefore, the flow advances from step ST50 to step ST52, and switch 27 is switched to the fourth contact by controller 100. In this case, since the average value ($\bar{I}$) is displayed on display 44, the operator adjusts the position of CCD 25d, as described above.

When the optical axis adjustment using CCDs 25a and 25d is completed, the operator operates key 43. Then, in step ST51, the CPU determines that the optical axis adjustment of the optical system is completed, and the processing is completed.

Figure 12:
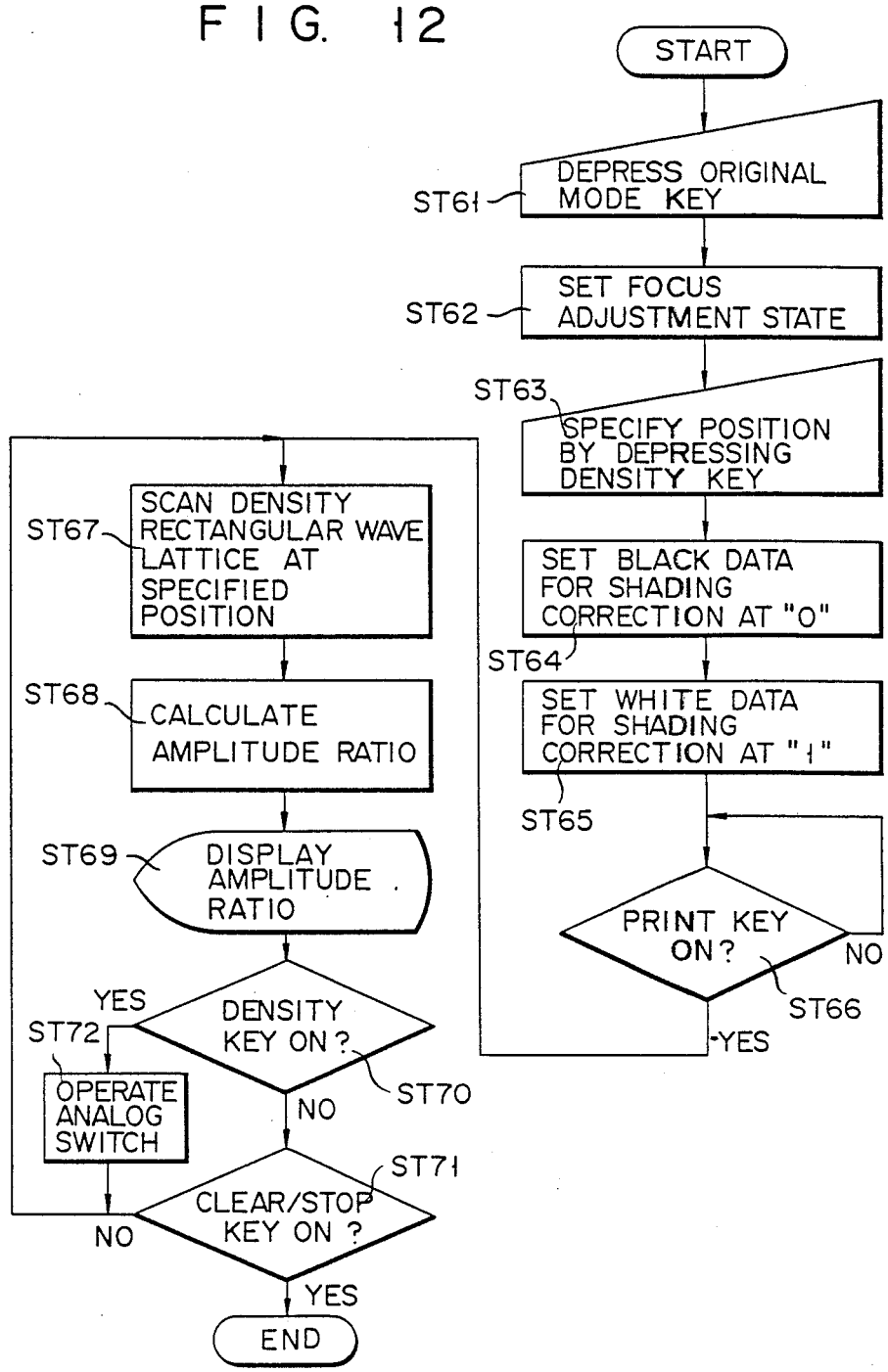

Referring to the flow chart of FIG. 12, focus adjustment of the optical system in the state of the adjustment mode will be described below. First, in steps ST61 and ST62, key 49 of panel 6 is depressed to illuminate display portion 30d, so that the focus adjustment state of the optical system is set. Then, in step ST63, key 7 of panel 6 is depressed to illuminate display portion 31a, so that CCD 25a corresponding to read position 4a of table 4 is specified.

In steps ST64 and ST65, data $I_B$ and data $I_W$ of circuit 102 stored in the line memory are forcibly set at "0" and "1", respectively, so that shading correction is released.

In this embodiment, in order to perform the focus adjustment of the optical system, the distance between the surface of table 4 and array 24 is varied by moving carriage 21. This is occurred the fact that a level of the white reference signal output from converter 25 is varied in accordance with changes in the distance described above. However, as described letter, if the read position of a focus adjusting original, i.e., the read position of the table 4 for performing the focus adjustment is spaced position from plate 28, the white refernce signal cannot be read in real time, and the shading correction cannot be perform by it.

Figure 13A:
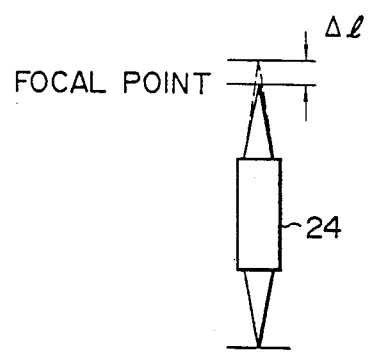
FIGS. 13A and 13B are a schematic view and a graph, respectively, showing a relationship between defocusing and MTF for explaining an operation of FIG. 12.
Figure 13B:
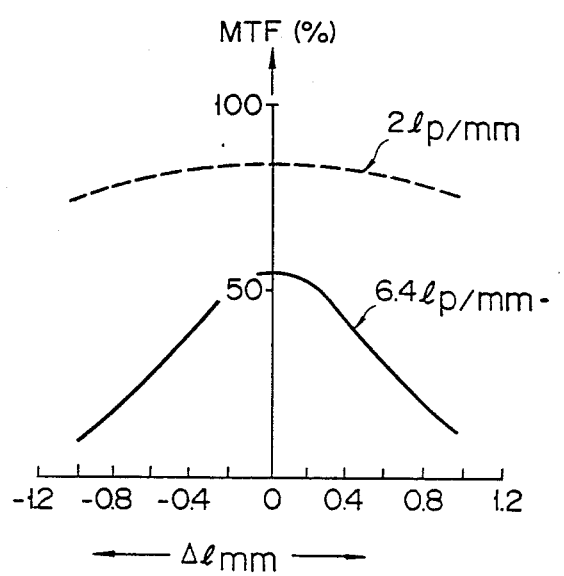

As shown in FIG. 13, the relationship between defocusing amount Δl and the MTF (Modulation Transfer Function) also depends on line density $\omega_1$ (line pair/mm) of the rectangular wave density lattice shown in FIG. 14. That is, the MTF ($\omega_1$) is obtained by the following equation:

MTF ($\omega_1$) = ($i(\omega_1)$max − $i(\omega_1)$min)/($i(\omega_1)$max + $i(\omega_1)$min) × 100 where $i(\omega_1)$max and $i(\omega_1)$min are the maximum and minimum values of a rectangular wave response of line density $\omega_1$ (line pair/mm). As a result, when the MTF is closer to 100%, image information closer to the original image can be obtained.

Figure 14A:
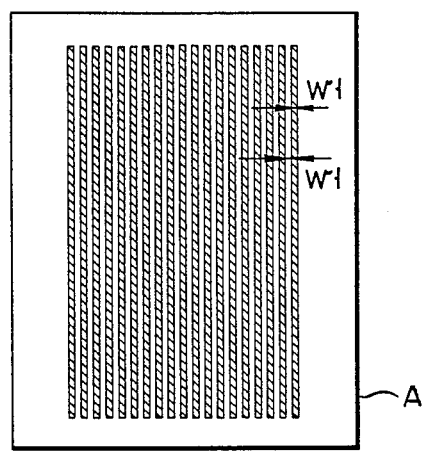
FIGS. 14A and 14B are plan views of examples of an arrangement of a rectangular wave density lattice.
Figure 14B:
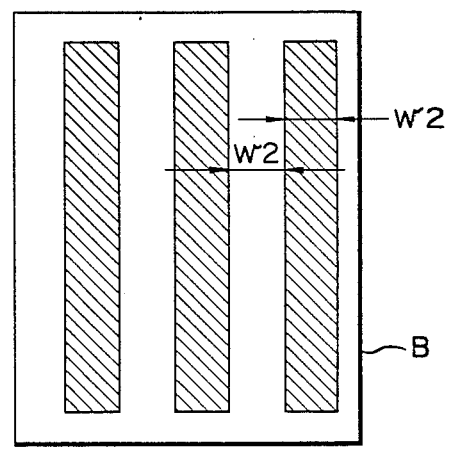

Therefore, in order to remove an illuminance varying effection on the original surface by the focus adjustment, originals A and B, on which two rectangular wave density lattices of line densities $\omega_1$ and $\omega_2$ are printed as shown in FIGS. 14A and 14B, respectively, are scanned to perform the focus adjustment of the optical system at the same time.

That is, in step ST66, if key 41 of panel 6 is depressed, the flow advances to step ST67. First, originals A and B having the rectangular wave density lattices of different line densities $\omega_1$ and $\omega_2$ thereon are scanned. Then, image signals corresponding to originals A and B are supplied to circuit 102 through the fourth contact of switch 27 and converter 108. Thereafter, the image signals are supplied to controller 100 through converter 108 and circuit 102 (however, the shading correction is released). In step ST68, controller 100 calculates an amplitude ratio of each image signal by the total sum of absolute values of a signal level of each pixel data included in the image range of specified CCD 25a in accordance with the following equation:

$$a\left[\sum_{x=1}^{n}|i(x,\omega_2)-I_0|/\sum_{x=1}^{n}|i(x,\omega_1)-I_0|\right]$$

where x is the pixel number, $I_0$ is a threshold value, and a is a constant.

In step ST69, the calculated amplitude ratio is displayed on display 44 of panel 6.

In this state, the operator determines whether the amplitude ratio displayed on display 44 is maximum. That is, the operator moves carriages 22a and 22b by a cam (not shown) so that the displayed amplitude ratio becomes maximum, thereby adjusting the distance between array 24 and the surface of read position 4a of table 4. At the same time, operations from step ST67 to step ST71 are repeated, and the amplitude ratio displayed on display 44 is varied in accordance with adjustment of the distance. If the displayed amplitude ratio is maximum, the operator operates key 7 to specify, e.g., CCD 25b. Therefore, the flow advances from step ST70 to step ST72, and switch 27 is switched to the second contact by controller 100. In this case, since the amplitude ratio of CCD 25b is displayed on display 44, the operator performs focus adjustment with respect to position 4b of table 4, as described above.

When the focus adjustment with respect to positions 4a to 4d using all the outputs from CCDs 25a to 25d is completed, the operator operates key 43. Then, in step ST71, the CPU determines that the focus adjustment of the optical system is completed, and the processing is completed. Note that the amplitude ratio calculated in step ST69 may be obtained by the following equation:

[MTF($\omega_2$)/MTF($\omega_1$)]·a where a is a constant.

In addition, carriage 21 is moved to adjust the optical system so that the amplitude ratio becomes maximum. However, in order to prevent a moire phenomenon, the optical system may be adjusted to a given blurring amount.

As has been described above, since adjustment states of offset voltage adjustment and gain adjustment of the amplifiers, optical axis adjustment, and focus adjustment, are numerically displayed on display 44 of panel 6, adjustment references or tolerances can be clearly obtained. Therefore, adjustment errors can be minimized to perform accurate adjustment.

In addition, since adjustment can be performed using controller 100, converter 108, and panel 6, other measuring instruments are not required for adjustment. Therefore, adjustment can be easily performed, resulting in short adjustment time and low cost.

Note that in the above embodiment, a description has been made with reference to the image information scanner apparatus applied to the thermal transfer color copying machine. However, the present invention is not limited to the above embodiment, but can be applied to an image information scanner apparatus in a scanner device, a facsimile device, or the like.

As has been described above in detail, according to the present invention, there is provided an image information scanner apparatus capable of minimizing adjustment errors by numerically defining adjustment states to obtain clear adjustment references or tolerances, and capable of easily performing adjustments without requiring the use of external measuring instruments.

What is claimed is:

1. An image information processing apparatus comprising:
   image information processing means including a plurality of elements to process image information under predetermined conditions;
   element testing means for outputting a number of characteristic value data corresponding to a number of said elements in order to test the plurality of elements;
   mode designating means for selectively designating one of a first mode for processing the image information using the image information processing means, or a second mode for testing the plurality of elements using the element testing means; and
   display means for displaying said predetermined conditions for processing said image by said image information processing means when said mode is designated by said mode designating means, and displaying characteristic value data corresponding to said plurality of elements output by said element testing means when said second mode is designated thereby.

2. The image information processing apparatus according to claim 1, wherein said mode designating means includes a plurality of keys and means for designating said second mode when the keys are operated in a predetermined order.

3. The image information processing apparatus according to claim 2, wherein said plurality of keys include ten keys on which said second mode can be designated when a predetermined code number is keyed in.

4. The image information processing apparatus according to claim 2, wherein said designating means recognizes said first mode when said plurality of keys are operated in other than said predetermined order and, at the same time, said predetermined conditions can be input to said image information processing means.

5. The image information processing apparatus according to claim 1, wherein said image information processing means comprises:
   image scanner means having an optical system for optically scanning an original to obtain a corresponding optical image and photoelectric converting means for converting said corresponding optical image to an electric signal; and
   signal processing means for receiving an electric signal from said photoelectric converting means and for performing a predetermined image processing to obtain predetermined image data.

6. The image information processing apparatus according to claim 5, wherein said processing means comprises:
   an amplifier for amplifying said electric signal from said photoelectric converting means and A/D converting means for converting an output of said amplifier to a digital signal.

7. The image information processing apparatus according to claim 6, wherein said element testing means delivers an output of said A/D converting means as said characteristic value data when said mode designating means is designated to said second mode.

8. The image information processing apparatus according to claim 7, wherein said amplifier includes means for adjusting an offset voltage thereof.

9. The image information processing apparatus according to claim 7, wherein said amplifier includes means for adjusting an amplification factor of said amplifier.

10. The image information processing apparatus according to claim 7, wherein said image scanner means includes means for adjusting an optical axis between said optical system and said photoelectric converting means.

11. The image information processing apparatus according to claim 7, wherein said image scanner means includes means for adjusting a focal point between said optical system and said photoelectric converting means.

12. The image information processing apparatus according to claim 8, wherein said element testing means includes means for computing an average value of pixel data included in a predetermined image range of said photoelectric converting means and delivering an average output as said characteristic value.

13. The image information processing apparatus according to claim 9, wherein said element testing means includes means for selecting a maximum value of each pixel data included in a predetermined image range of said photoelectric converting means, and delivering a maximum value selection output as characteristic value data.

14. The image information processing apparatus according to claim 10, wherein said element testing means includes means for computing an average value of each pixel data included in a predetermined image range of said photoelectric converting means and delivering an average output as said characteristic value.

15. The image information processing apparatus according to claim 10, wherein said means for adjusting an optical axis includes means for adjusting a relative position of said photoelectric converting means.

16. The image information processing apparatus according to claim 11, wherein said element testing means includes means for allowing a total sum of absolute values of respective pixel data which are included within a predetermined image of said photoelectric converting means to be computed for each of two kinds of originals which has a different density rectangular wave lattice and for evaluating amplitude ratios of said respective pixel data on the basis of two computed values, said element testing means delivering the evaluated amplitude ratios as said characteristic value data.

* * * * *